United States Patent [19]

Van Lierop et al.

[11] Patent Number: 4,806,328

[45] Date of Patent: Feb. 21, 1989

[54] METHOD OF MANUFACTURING MONOLITHIC GLASS MEMBERS

[75] Inventors: Joseph G. Van Lierop; Arnoldus B. M. Bögemann, both of Eindhoven; Willy J. B. Felder, Vijlen; Albert Huizing, Eindhoven, all of Netherlands

[73] Assignee: U.S. Philips Corporation, New York, N.Y.

[21] Appl. No.: 781,427

[22] Filed: Sep. 30, 1985

[30] Foreign Application Priority Data

Dec. 3, 1984 [NL] Netherlands .......................... 8403667

[51] Int. Cl.$^4$ ....................... C01B 33/16; C01B 33/12
[52] U.S. Cl. ..................................... 423/338; 423/335; 501/12
[58] Field of Search ................... 501/12; 423/338, 335

[56] References Cited

U.S. PATENT DOCUMENTS

| | | | |
|---|---|---|---|
| 3,501,269 | 3/1970 | Winyall et al. | 423/338 OR |
| 4,206,297 | 6/1980 | Hoff et al. | 423/338 X |
| 4,327,065 | 4/1982 | von Dardel et al. | 423/338 OR |
| 4,432,956 | 2/1984 | Zarzycki et al. | 423/338 OR |

FOREIGN PATENT DOCUMENTS 0102833  6/1984  Japan ...................................... 501/12

OTHER PUBLICATIONS

Lewis, "Studies on Hydrolysis and Condensation of Silicon Alkoxides", Corporate Research Laboratories.

*Primary Examiner*—William R. Dixon, Jr.
*Assistant Examiner*—Karl Group
*Attorney, Agent, or Firm*—Paul R. Miller

[57] ABSTRACT

Monolithic glass members are prepared by first hydrolyzing a solution of tetraethoxysilane in alcohol with an acid medium, and then gelating in a basic medium while using acid and base mediums to form compounds that volatilize during drying and sintering the gel. Substances, if any, which in the form of oxides can form a glass with $SiO_2$, are added after hydrolyzing and prior to gelation.

12 Claims, No Drawings

METHOD OF MANUFACTURING MONOLITHIC GLASS MEMBERS

The invention relates to a method of manufacturing monolithic glass members by preparing a monolithic gel for an alcoholic solution which comprises tetraethoxysilane (($C_2H_5O)_4Si$, sometimes termed ethyl orthosilicate), drying the gel and then densifying it by heating, in which at least drying takes place by heating the gel in a hermetically sealed container to a temperature above the critical temperature of the alcoholic solvent and then removing the pressure.

Such a method is disclosed in U.S. Pat. No. 4,432,956. This patent describes a method according to which a gel is prepared from a solution of an alkoxysilane, in particular tetramethoxysilane (($CH_3O)_4Si$) in the corresponding alcohol to which a quantity of water sufficient for hydrolysing the silane is added. After the gel has formed at least partly, it is placed in an autoclave. An extra quantity of alcohol is provided in the autoclave so that, when the critical temperature is reached, the critical pressure of the alcohol is also reached. After the temperature has risen to above the critical temperature of the solvent, the pressure in the autoclave is slowly reduced. In this manner a dry monolithic gel could be obtained without tears or cracks being formed during drying. According to the patent the removal of pressure usually takes place in 2 to 5 hours. This drying time is very favorably compared with drying times at atmospheric pressure which may be a week or more and in which drying times shrinkage of the gel can apparently not be avoided (see, for example, Electronics Letters 19 (1982), p. 499: "New optical Fibre Fabrication Method").

The drying of a gel above the critical temperature in an autoclave presents the advantage that capillary forces in the pores of the gel cannot occur when the pressure is removed, because a liquid-vapour interface is no longer present in the pores. Moreover, the drying time is much less dependent on the dimensions or the form of the gel.

In the known method the inner volume of the hermetically sealed container used is smaller than the critical volume of the quantity of alcohol present. In ideal circumstances, boiling phenomena might not occur in the alcohol upon heating to above-critical temperature. "Ideal circumstances" is to be understood to mean herein that the temperature in the hermetically sealed container can be raised uniformly without temperature gradients occurring. It has been found that this is particularly difficult to realize in practice; this is the case in particular with high volume autoclaves which, unfortunately, have to be used in the industrial performance of these processes. It has been found in practice that boiling phenomena as a result of local overheating in the gelating solution and after the gel formation, can hardly be avoided. This results in damage to the gels.

Another disadvantage is that during heating to the critical temperature in practice often liquid-gas interfaces are formed in the pores of the gel. As a result thereof capillary forces occur in the pores causing shrinkage or even disintegration of the gel.

It has been found that in a method in which gelation takes place in a hermetically sealed container and when in the hermetically sealed container a pre-pressure is provided of a gas having a pressure so high that no boiling phenomena can occur during heating to a temperature above the critical temperature (see Netherlands non-prepublished Patent Application NL 8304348, corresponding to U.S. continuation patent application Ser. No. 785,088, filed Oct. 4, 1985), gelation must preferably be carried out in the presence of a volatile basic material when tetraethoxysilane is used. It has been found that the gelation time and the structure and hence the shrinkage of the gel during gelation and subsequent drying depend on the pH of the solution. When a volatile basic material is used, reprodicible results are possible only when the process steps are controlled carefully. In connection with $CO_2$-take up from the atmosphere and evaporation of the volatile basic material it is necessary to accurately control the temperature of the basic solution and the time it is exposed to the atmosphere. The use of a volatile basic material can hardly be avoided if on the one hand the gelation in the hermetically sealed container is to be carried out at a reasonable rate and on the other hand the introduction of, for example, alkali oxides in the quartz glass is to be avoided.

It is the object of the invention to avoid the above problems as much as possible and to produce still other advantages to be described in detail hereinafter.

According to the invention, this is achieved by means of a method which is characterized in that, in a first step, tetraethoxysilane dissolved in an alcohol is hydrolyzed by the addition of water and an acid and, in a second step, water and a quantity of a basic material are added to the hydrolyzed solution, which quantity of a basic material is more than sufficient to neutralize the quantity of acid present, the acid and the basic material being chosen so that in the neutralization step a compound is formed which is sufficiently volatile to escape in the subsequent process steps, after which, if desired, after gelation of the basically reacting hydrolyzed tetraethoxysilane, the reaction mixture is placed in a hermetically sealed container under a pre-pressure of a gas which is so high that during heating to a temperature above the critical temperature, boiling phenomena in the solvent cannot occur.

The gelation may take place partly or entirely in the hermetically sealed container.

For example, hydrochloric acid (HCl) or nitric acid ($HNO_3$) may be used in the acidic hydrolysis of tetraethoxysilane. In gelation in basic medium and for neutralizing the acid, for example, an ammonia solution ($NH_4OH$) or an organic nitrogen base may be used which forms a compound with the acid present and, during removing the pressure, disappears together with the solvent.

It has been found that by using the method according to the invention homogeneous solutions with high silicon contents can be obtained.

Experiments have demonstrated that the ultimate density (weight/volume) of the monolithic gel can also be determined with the value of the pre-pressure. It has been established that the higher the pre-pressure is chosen, the smaller is the density of the monolithic gels which can be manufactured by means of the method according to the invention. By choosing a suitable pre-pressure it can be achieved that the monolithic gel, during the heating to a temperature above the critical temperature, and during the removal of the pressure, does substantially not shrink and hence after drying has a shape and dimensions which are the same as they were during the formation of the gel. Obviously, by applying a sufficiently high pre-pressure, the formation of liquid-gas interfaces in the pores of the gel is effectively suppressed or at least the detrimental influence thereof is suppressed.

It has been found to be unnecessary for the volume of the hermetically sealed container to be smaller than the critical volume of the quantity of alcoholic solvent present in the space. During heating to the critical temperature and with a correct choice of the pre-pressure the overall pressure in the hermetically sealed container at any temperature is always higher than the saturation vapour pressure of the solvent used in the manufacture of the gel. With a mixture of solvents which mutually have different critical temperatures and, if the concentration ratios are such that at the lowest critical temperature of any solvent present the other solvent or solvents is or are still present as a liquid, heating is carried out to a temperature at which the last solvent has also passed completely into the gaseous phase.

Suitable gases or low-boiling-point substances which may be used for providing a pre-pressure are, for example, hydrogen, helium, nitrogen, oxygen chlorine, thionyl chloride and argon.

The temperature to which heating may be carried out, provided it is above the critical temperature of the solvent(s), is in principle restricted only by the pressure and the temperature which the walls of the hermetically sealed container can withstand, and optionally, the temperature at which organic substances present in the container start to carbonize. When a solvent is used which consists entirely or predominantly of ethanol, a pre-pressure of at least 50 bars is preferably used if shrinkage of the monolithic gel during heating to the critical temperature, and the subsequent removal of pressure, is to be avoided. The critical temperature of ethanol is 243° C. Suitable temperatures are between 275° and 325° C. if the solvent consists substantially of ethanol. The pressure in the hermetically sealed container may rise to above 300 bars.

It has been found that the removal of the pressure may be carried out in a relatively rapid manner. A gel having a length of 400 nm and a diameter of approximately 30 mm, for example, can be dried in one hour.

Suppression of shrinkage during drying is of particular importance if the object of the method according to the invention is to manufacture monolithic gels in the form of tubes, for example, a cylindrical vessel in which a cylinder is arranged centrally with an axis coinciding with that of the cylindrical vessel. If the gel would shrink and stick to the cylinder during drying, the monolithic gel could hardly be removed from such a mould without damage.

One or more compounds of other elements in which the oxides can form a glass with $SiO_2$ may be added to the solution of tetraethoxysilane ($Si(OC_2(H_5)_4$), for example, to adjust the refractive index of the glass member obtained after densification of the gel at a given value and/or to control other physical properties. Examples of such compounds are alkoxy compounds of aluminium, titanium, boron, germanium, rare earths and the like, of which the alkoxy groups each generally do not comprise more than 4 carbon atoms. Nitrates, carbonates, acetates and other compounds which decompose easily while forming oxides, may optionally also be used. Fluorine may be incorporated by adding fluorine compounds, such as, $NH_4F$, $HF$ or $NH_4F.HF.$, to the solution. The $SiO_2$-concentration can be increased, by adding $SiO_2$ as such to the tetraethoxysilane solution. The $SiO_2$ should be in finely divided particle form (aerogel). Other glass formers in finely divided form could be added in this way to increase their concentration in the solution.

It has been found that it is advantageous in the method according to the invention to add compounds to the tetraethoxysilane solution only after this has been hydrolyzed in the first step of the method by the addition of water and acid. As a result a good distribution of the relevant element in the $SiO_2$ skeleton is also produced in those cases in which a hydrolysis of the compound of the relevant element occurs more rapidly than that of tetraethoxy silane.

When aqueous solution of an acid are used to create the desired medium for hydrolysis of the tetraethoxysilane, the added quantity of water is included in the quantity of water needed for the hydrolysis of the tetraethoxysilane and any alkoxy or other compounds of elements to be added, which with $SiO_2$ can form a glass form of their oxides. The solutions are placed in the autoclave in vessels of suitable shape and dimension. The vessel, corresponds in shape and dimension to the shape and dimension of the monolithic gel which it is desired to manufacture. The vessel and optionally a cylinder placed therein, if a tubular gel is manufactured, may consist of any material which, if desired, is substantially inert with respect to the liquids used. The vessel may be, for example, of quartz glass. In order to avoid sticking, the surface, which comes in contact with the liquid, may be lined with a material, for example silicone rubber and the like.

After the gel formation, densification may take place by heating, for some time at a high temperature, for example, at 1300° C., in an oxidizing atmosphere, for example. Depending on the duration of heating and the temperature, a more or less porous member is obtained. It is possible to manufacture a completely solid member, for example, by heating at 1300° C. at a rate of 300° C. per hour and maintaining this temperature for approximately one hour. Heating may be carried out entirely or partly in a chlorine-containing atmosphere to remove the last hydroxyl groups from the gel.

The method according to the invention permits manufacture of glass members of any shape and optionally with a given degree of porosity.

The glass members obtained by means of the method according to the invention may be used in the manufacture of optical fibers, carriers for catalysts (the members themselves may be used as the catalyst surface) for selective separation of components, and molecular sieves.

The invention will now be described in greater detail with reference to the following specific examples.

EXAMPLE 1

Starting from the molar ratio $Si(OC_2H_5)_4:C_2H_5OH:H_2O = 1:2:2$, first of all, the tetraethoxysilane is dissolved in (absolute) ethanol, and the water is then added in two fractions. In the first instance 3 parts by volume of $10^{-2}M$ HCl are added to the solution of tetraethoxysilane in ethanol, after which stirring is carried out at 40° C. for 30 minutes. After cooling to room temperature, 13 parts by volume of $6 \times 10^{-2}M$ $NH_4OH$ are added while stirring. The solution is then provided in moulds coated with silicone rubber. The moulds are placed in an autoclave. A pre-pressure of 80 bars of $N_2$ is adjusted, and the temperature is raised to approximately 300° C., at a heating rate of: 50° C./hour. After approximately 1 hour at 300° C. the pressure is gradually removed and the furnace is then switched off. At room temperature the autoclave is opened and the formed and dried gels in the form of tubes or rods may be taken out of the moulds.

EXAMPLE 2

313 g of (absolute) ethanol are added in a beaker to 708 g of tetraethoxysilane. Twenty three g of an aqueous solution of $10^{-2}$M HCl are added to the solution while stirring. The solution is heated to 40° C. for approximately 10 minutes. After cooling to room temperature, 99.5 g of aqueous solution of $6 \times 10^{-2}$M NH$_4$OH are added. Fifty nine Pyrex holders coated on their insides with silicone rubber are then filled with the solution and placed in an autoclave of 5 l capacity. After closing the autoclave a pre-pressure of 80 bars of N$_2$ is applied. The ultimate temperature of 300° C. is reached at a rate of 50° C. per hour. After approximately 1 hour at this temperature, the pressure is gradually removed (approximately 1 hour) while maintaining the temperature. The heating is then switched off. The autoclave is opened at room temperature resulting in 58 rods of 15 mm diameter and 150 mm length. The rods do not show any tears or cracks and were in the tubes with a sliding fit. The apparent density is 0.17 g/cm$^3$.

EXAMPLE 3

As in Example 1 a hydrolyzed solution of tetraethoxy silane is prepared. After cooling to room temperature a quantity of boromethanolate is added which corresponds to 10 mol.% of B$_2$O$_3$ with respect to a quantity of SiO$_2$. As a result of this, boromethanolate is prevented from reacting directly with water and a precipitate is formed; what is achieved is that the boron can be bound in a simple manner by reaction of boromethanolate with hydrolyzed silicon. The reaction time is approximately 10 minutes. A solution of NH$_4$OH is then added as in Example 1. The procedure is further identical to that of Example 1.

EXAMPLE 4

To start, a molar ratio of Si(OC$_2$H$_5$)$_4$:H$_2$O:C$_2$O$_5$OH:1:4:4 is provided. First the tetraethoxysilane is dissolved in ethanol, and the "acid" fraction of: 7 parts by volume of $10^{-2}$M HCL is then added. After cooling to room temperature, germanium ethanolate (5 mol.% of GeO$_2$ with respect to SiO$_2$) is added. The "basic" fraction of, 25 parts by volume of $6 \times 10^{-2}$M NH$_4$OH is then added. The procedure is further identical to that of Example 1. After drying, monolithic gels having an apparent density of 0.16 g/cm$^3$ are obtained.

EXAMPLE 5

To start, a molar ratio of: Si(OC$_2$H$_5$)$_4$:H$_2$O:O$_2$H$_5$OH=1:2:2 is formed. First the tetraethoxysilane is dissolved in ethanol, and the "acid" fraction of: 3 parts by volume of $10^{-2}$M HCl is then added. After cooling to room temperature, aluminium isopropionate (15 mol.% Al$_2$O$_3$ with respect to SiO$_2$) is added. The "basic" fraction of, 17 parts by volume of $6 \times 10^{-2}$M NH$_4$OH, is then added. The procedure then is further identical to that of Example 1. Gels having an apparent density of 0.223 g/cm$^3$ result after drying.

EXAMPLE 6

To start, a molar ratio of: Si(OC$_2$H$_5$)$_4$:H$_2$O:C$_2$H$_5$OH=1:2:2 is provided. One part by volume of $10^{-2}$M HCl is added to the alcoholic silicon ethanolate solution. It is stirred at 50° C. for 30 minutes. After cooling to room temperature, terbium nitrate, Tb(NO$_3$)$_3$.6H$_2$O, is added to this solution and dissolved. After 15 minutes of stirring, 7 parts by volume of 2M NH$_4$OH, are added. The solution is provided in moulds lined with silicone rubber. The moulds are then provided in the autoclave, a pre-pressure of nitrogen is applied, and the temperature is raised to above the critical temperature of ethanol (T$_{cr}$=243° C.). The pressure is slowly removed and the autoclave is then cooled to room temperature. The dry gel is removed from the mould. The resulting gel is luminescent.

Rods having a diameter of 75 mm and a length of 350 mm and more were obtained by means of the method according to the invention. Tubes were also manufactured having an outside diameter of 28 mm and an inside diameter of 4 to 10 mm. The length was 400 mm. The dimensions of the autoclave imposed a non-essential restriction. Members having a rectangular cross-section were also manufactured ($10 \times 10 \times 150$ mm). The apparent densities of the monolithic gels prior to densification are usually between 0.15 and 0.25 g/cm$^3$.

What is claimed is

1. A method of manufacturing monolithic glass members comprising the steps of preparing a monolithic gel by
    dissolving tetraethoxysilane (C$_2$H$_5$O)$_4$Si) in an ethanol,
    hydrolyzing said tetraethoxysilane in said ethanol by adding water and an acid to form a hydrolyzed solution,
    adding water and a base material to said hydrolyzed solution, said base material being added in a quantity to neutralize said acid,
    forming a neutralized compound from said acid and said base material, said neutralized compound being sufficiently volatile to subsequently escape,
    drying said gel by
    placing said gel into a hermetically sealed container under a pre-pressure of a gas, wherein said pre-pressure is at least 50 bars,
    heating said gel to a temperature above the critical temperature of said gel, said pre-pressure being sufficiently high to prevent boiling of the solvent of said gel at said temperature,
    and then densifying said gel by said heating and removing said pre-pressure.

2. A method according to claim 1, wherein said gas is selected from the group consisting of hydrogen, helium, nitrogen, oxygen, chlorine, and argon.

3. A method according to claim 1, wherein said gas is thionyl chloride.

4. A method according to claim 1, wherein said step of heating is carried out at a temperature between 275 and 325° C.

5. A method according to claim 1, wherein at least one compound which forms a glass with SiO$_2$ is added to said hydrolyzed solution prior to gelation occurring.

6. A method according to claim 1, wherein a fluorine compound selected from the group consisting of HF, NH$_4$F and NH$_4$F—HF is added to said hydrolyzed solution prior to gelation occurring.

7. A method according to claim 1, wherein a compound selected from the group consisting of aluminum, titanium, boron, germanium, and a rare earth is added to said hydrolyzed solution prior to gelation occurring.

8. A method according to claim 1, wherein a compound selected from the group consisting of aluminum, titanium, boron, germanium and a rare earth is added to said hydrolyzed solution prior to gelation occurring, said compound decomposing at temperatures used to form oxides.

9. A method according to claim 1, wherein said acid is selected from the group consisting of HCl and $HNO_3$.

10. A method according to claim 9, wherein said base material is selected from the group consisting of $NH_4OH$ and an organic nitrogen base.

11. A method according to claim 1, wherein said pre-pressure is at least 80 bars.

12. A method according to claim 1 or claim 4, wherein said temperature is 300° C.

* * * * *